US012794314B2

(12) United States Patent
Li et al.

(10) Patent No.: US 12,794,314 B2

(45) Date of Patent: Nov. 10, 2026

(54) PRESSURE RING WITH BALANCING BLOCK FOR ELECTRIC MACHINE ROTOR AND ELECTRIC MACHINE

(71) Applicant: MERITOR ELECTRIC VEHICLES GERMANY GMBH, Nuremberg (DE)

(72) Inventors: Hai Bin Li, Nuremberg (DE); Han Wang Zhao, Nuremberg (DE)

(73) Assignee: MERITOR ELECTRIC VEHICLES GERMANY GMBH, Nuremberg (DE)

(*) Notice: Subject to any disclaimer, the term of this patent is extended or adjusted under 35 U.S.C. 154(b) by 212 days.

(21) Appl. No.: 18/724,879

(22) PCT Filed: Dec. 30, 2022

(86) PCT No.: PCT/EP2022/088082
§ 371 (c)(1),
(2) Date: Jun. 27, 2024

(87) PCT Pub. No.: WO2023/126523
PCT Pub. Date: Jul. 6, 2023

(65) Prior Publication Data

US 2025/0079933 A1 Mar. 6, 2025

(30) Foreign Application Priority Data

Dec. 30, 2021 (CN) ......................... 202123409196.4

(51) Int. Cl.
*H02K 7/04* (2006.01)

(52) U.S. Cl.
CPC ...................................... *H02K 7/04* (2013.01)

(58) Field of Classification Search
CPC .......... H02K 1/277; H02K 1/276; H02K 7/04; H02K 1/28; F04C 2240/60; F04C 2230/60; F04C 18/0215; F04C 23/008; F04C 29/0085
USPC ... 310/51, 156.09, 156.13, 216.113–216.125
See application file for complete search history.

(56) References Cited

U.S. PATENT DOCUMENTS 4,388,756 A * 6/1983 Bums ........................ H02K 7/04 29/598
4,888,866 A * 12/1989 Hansen ................ H02K 15/021 29/598
5,282,309 A * 2/1994 La Rue ................ H02K 15/165 29/736
6,291,920 B1 * 9/2001 Miller ................... F16F 15/322 464/180

(Continued)

FOREIGN PATENT DOCUMENTS

CN 108462347 A 8/2018
EP 2924853 A1 9/2015
EP 3667867 A1 6/2020

OTHER PUBLICATIONS

International Search Report dated Apr. 17, 2023 for related PCT Appln. No. PCT/EP2022/088082; 13 pages.

*Primary Examiner* — Maged M Almawri

(74) *Attorney, Agent, or Firm* — Brooks Kushman P.C.

(57) ABSTRACT

A pressure ring for an electric machine rotor, an electric machine rotor, and an electric machine. The pressure ring comprises an annular shell and at least one balancing block. The annular shell comprises an annular flat surface and a columnar flat surface. An annular groove and at least one first fixing hole are provided on the annular flat surface.

12 Claims, 6 Drawing Sheets

(56) References Cited

U.S. PATENT DOCUMENTS

| | | | | |
|---|---|---|---|---|
| 6,585,496 | B1 * | 7/2003 | Sun | F04C 29/028<br>417/410.5 |
| 9,866,080 | B2 * | 1/2018 | Kim | F04C 23/001 |
| 10,186,928 | B2 * | 1/2019 | Firat | H02K 11/25 |
| 10,476,334 | B2 * | 11/2019 | Owen | H01G 4/248 |
| 10,491,067 | B2 * | 11/2019 | Fraser | B60L 50/51 |
| 10,749,404 | B2 * | 8/2020 | Degner | H02K 3/525 |
| 11,025,141 | B2 * | 6/2021 | Kagawa | H02M 1/126 |
| 11,289,985 | B2 * | 3/2022 | Tangudu | H02K 1/30 |
| 11,456,637 | B2 * | 9/2022 | Sakauchi | H02K 1/146 |
| 12,057,754 | B2 * | 8/2024 | Zhang | H02K 11/22 |
| 2006/0103253 | A1 * | 5/2006 | Shiga | H02K 15/03<br>310/43 |
| 2006/0133944 | A1 * | 6/2006 | Doepker | F04C 18/0215<br>418/55.1 |
| 2010/0201213 | A1 * | 8/2010 | Kataoka | H02K 11/21<br>310/71 |
| 2013/0248022 | A1 * | 9/2013 | Roof | F04C 23/008<br>137/544 |
| 2014/0125173 | A1 * | 5/2014 | Hayashi | H02K 5/10<br>310/88 |
| 2015/0188377 | A1 * | 7/2015 | Kim | H02K 1/278<br>417/415 |
| 2015/0200579 | A1 * | 7/2015 | Seo | H02K 7/04<br>310/43 |
| 2015/0357870 | A1 * | 12/2015 | Hazeyama | H02K 1/2766<br>310/156.07 |
| 2017/0093239 | A1 * | 3/2017 | Teranishi | H02K 3/28 |
| 2017/0126092 | A1 * | 5/2017 | Han | H02K 5/225 |
| 2018/0241268 | A1 * | 8/2018 | Asahi | H02K 3/28 |
| 2018/0309340 | A1 * | 10/2018 | Ogawa | H02K 3/28 |
| 2019/0356190 | A1 * | 11/2019 | Kitta | H02K 1/148 |
| 2020/0059127 | A1 * | 2/2020 | Yamashita | H02K 3/522 |
| 2021/0194310 | A1 * | 6/2021 | Yoshikawa | H02K 5/225 |
| 2021/0305870 | A1 * | 9/2021 | Takahashi | H02K 5/08 |
| 2022/0271597 | A1 * | 8/2022 | Kamizato | H02K 3/50 |
| 2023/0101842 | A1 * | 3/2023 | Okamoto | H02K 5/1672<br>310/66 |
| 2024/0305146 | A1 * | 9/2024 | Zuo | H02K 1/148 |
| 2024/0429767 | A1 * | 12/2024 | Ha | H02K 3/522 |

* cited by examiner

PRESSURE RING WITH BALANCING BLOCK FOR ELECTRIC MACHINE ROTOR AND ELECTRIC MACHINE

CROSS-REFERENCE TO RELATED APPLICATIONS

This application is the U.S. national phase of PCT Application No. PCT/EP2022/088082,filed Dec. 30, 2022, which claims priority to China Patent Application No. 202123409196.4, filed Dec. 30, 2021, the disclosures of which are incorporated in their entirety by reference herein.

TECHNICAL FIELD

The present invention relates to the technical field of electrical engineering, in particular to a pressure ring for an electric machine rotor, an electric machine rotor and an electric machine.

BACKGROUND ART

In the technical field of electrical engineering, the rotor of an electric machine will often generate vibration during high-speed motion. This problem is generally solved by adding a balancing post and a spacer, to reduce the generated vibration through adjustment of rotor balance.

However, the balancing post and spacer generally need to be fixed to a pressure ring, the balancing post cannot be fixed at certain specific positions, and the rotor will also be subjected to shock in the process of installing the spacer. Thus, when a balancing post and spacer are used to adjust rotor balance, the result is poor.

SUMMARY OF THE INVENTION

The present invention provides a pressure ring for an electric machine rotor, an electric machine rotor and an electric machine, which enable electric machine rotor balance to be adjusted.

In a first aspect, the present invention provides a pressure ring for an electric machine rotor. The pressure ring comprises an annular shell and at least one balancing block. The annular shell comprises an annular flat surface and a columnar flat surface. A first installation hole is formed in the annular flat surface. A bottom edge of the columnar flat surface coincides with an outer ring edge of the annular flat surface. An annular groove and at least one first fixing hole are provided on the annular flat surface of the annular shell. A rotation shaft of the electric machine passes through the first installation hole. The rotor of the electric machine is fixed to the annular shell by means of the first fixing hole, so that the electric machine rotor drives the annular shell to rotate. The at least one balancing block is distributed in the annular groove of the annular flat surface, to adjust rotor balance when the electric machine rotor rotates.

The annular groove may be configured as a trapezoidal groove. The width of a groove mouth in the trapezoidal groove may be less than the width of a groove bottom.

The pressure ring may further comprise at least one fan blade. The at least one fan blade may be distributed inside the annular shell. The positions of the first fixing hole and the fan blade may not coincide.

An angle formed by two rays extending from the center position of the first installation hole to two adjacent fan blades may not be greater than 30°.

The fan blade may be trapezoidal. The length of a lower base of the trapezoidal shape may be greater than the length of an upper base. The lower base may be an edge in contact with the annular flat surface.

The fan blade may be perpendicular to the annular flat surface. The lower base of the fan blade may lie in a radial direction of the annular flat surface. One end of the lower base of the fan blade may be aligned with an inner ring edge of the annular flat surface.

In a second aspect, the present invention provides an electric machine rotor, comprising a rotor body, and the pressure ring according to the previous aspect. The pressure ring may be fixed to the rotor body by means of at least one first fixing hole.

In a third aspect, the present invention provides an electric machine, comprising an electric machine body and the pressure ring according to according to the first aspect. The pressure ring may be fixed to a rotor of the electric machine body by means of at least one first fixing hole.

It can be seen from the technical solution described above that the pressure ring for the electric machine rotor may comprise the annular shell and the balancing block, and the bottom edge of the columnar flat surface coincides with the outer ring edge of the annular flat surface to form the annular shell. The first installation hole is formed in the annular flat surface of the annular shell, and the annular groove and first fixing hole are provided on the annular flat surface. Thus, the rotation shaft of the electric machine can pass through the first installation hole, and the electric machine rotor can be fixed to the annular shell by means of the first fixing hole, such that the electric machine rotor drives the annular shell to rotate. At least one balancing block is distributed in the annular groove, so that rotor balance can be adjusted when the electric machine rotor rotates.

| | | |
|---|---|---|
| 10: annular shell | 20: balancing block | 30: first installation hole |
| 101: annular flat surface | 102: columnar flat surface | 103: annular groove |
| 104: first fixing hole | 1031: groove mouth | 1032: groove bottom |
| 50: fan blade | 501: upper base | 502: lower base |

DETAILED DESCRIPTION OF THE INVENTION

As stated above, the rotor of an electric machine will often generate vibration during high-speed motion; the vibration thus generated will cause drawbacks such as noise, accelerated bearing wear and a shortened mechanical life, and in severe cases may even cause destructive accidents. The cause of the vibration is poor rotor balance. Thus, to reduce the vibration generated by the electric machine during operation, it is generally necessary to adjust the balance of the electric machine rotor.

At present, when adjusting the balance of the electric machine rotor, a balancing post and a spacer will generally be fixed to a pressure ring of the electric machine rotor, the balancing post and spacer being used to adjust the balance of the rotor. However, the balancing post cannot be fixed at certain specific positions, and the process of installing the spacer will also subject the rotor to shock. Thus, when a balancing post and spacer are used to adjust the balance of an electric machine rotor, the result is poor.

In view of this, in the present invention, consideration is given to providing an annular groove inside a pressure ring of an electric machine rotor, and distributing balancing blocks inside the annular groove, such that the balancing blocks will not be unable to be installed because of specific positions, and are thus able to effectively adjust the balance of the electric machine rotor.

The pressure ring for an electric machine rotor, the electric machine rotor and the electric machine that are provided in embodiments of the present invention are described in detail below with reference to the drawings.

Figure 1:
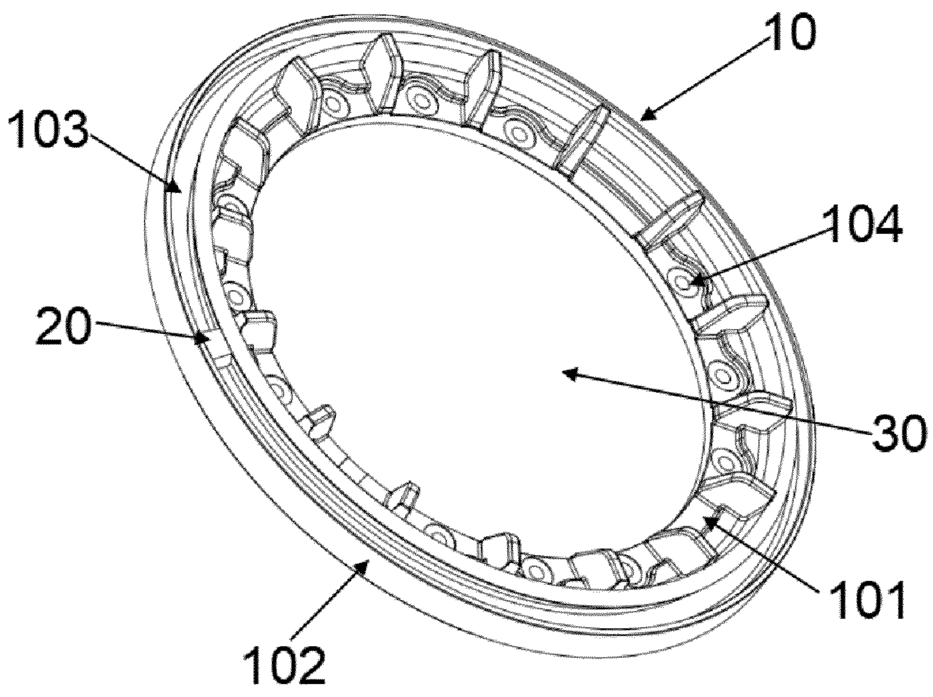
FIG. 1 is a schematic drawing of a pressure ring for an electric machine rotor, as provided in an embodiment of the present invention.

As shown in FIG. 1, the present invention provides a pressure ring for an electric machine rotor; the pressure ring may comprise: an annular shell 10 and at least one balancing block 20; the annular shell 10 comprises an annular flat surface 101 and a columnar flat surface 102, wherein a first installation hole 30 is formed in the annular flat surface 101, and a bottom edge of the columnar flat surface 102 coincides with an outer ring edge of the annular flat surface 101; an annular groove 103 and at least one first fixing hole 104 are provided on the annular flat surface 101 of the annular shell 10; a rotation shaft of the electric machine passes through the first installation hole 30, and the electric machine rotor is fixed to the annular shell 10 by means of the first fixing hole 104, so that the electric machine rotor drives the annular shell 10 to rotate; the at least one balancing block 20 is distributed in the annular groove 103 of the annular flat surface 101, to adjust rotor balance when the electric machine rotor rotates.

In embodiments of the present invention, the pressure ring for the electric machine rotor may comprise the annular shell 10 and the balancing block 20, and the bottom edge of the columnar flat surface 102 coincides with the outer ring edge of the annular flat surface 101 to form the annular shell 10. The first installation hole 30 is formed in the annular flat surface 101 of the annular shell 10, and the annular groove 103 and first fixing hole 104 are provided on the annular flat surface 101. Thus, the rotation shaft of the electric machine can pass through the first installation hole 30, and the electric machine rotor can be fixed to the annular shell 10 by means of the first fixing hole 104, such that the electric machine rotor drives the annular shell 10 to rotate. At least one balancing block 20 is distributed in the annular groove 103, so that rotor balance can be adjusted when the electric machine rotor rotates.

As can be seen, in this embodiment, the annular groove 103 is specially provided inside the annular shell 10 for the purpose of distributing the balancing block 20. The groove is annular, that is to say, the balancing block 20 can be disposed at any position in the annular groove 103 to adjust rotor balance, so the problem of being unable to install the balancing block 20 because of certain specific positions does not arise. For this reason, rotor balance can be adjusted effectively.

Figure 2:
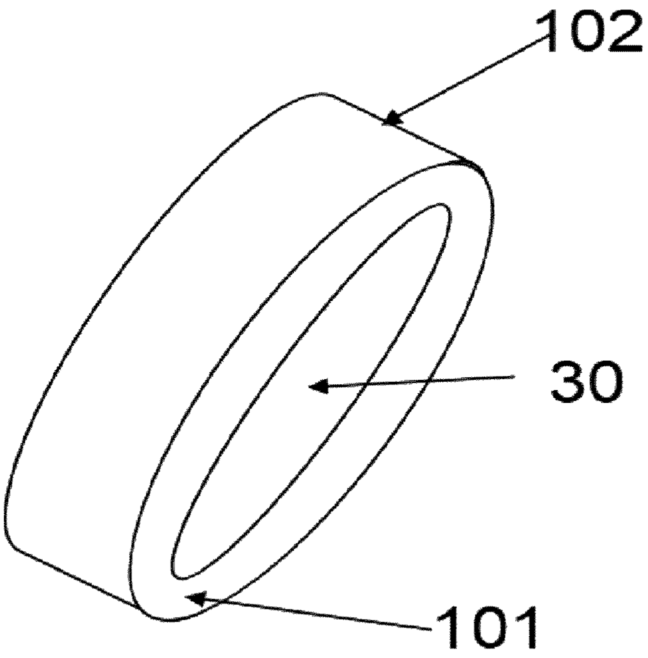
FIG. 2 is a schematic drawing of an annular shell, as provided in an embodiment of the present invention.

As shown in FIG. 2, consideration may be given to having the annular shell 10 formed of one annular flat surface 101 and one columnar flat surface 102. For example, the bottom edge of the columnar flat surface 102 coincides with the outer ring edge of the annular flat surface 101; by fixing these two edges, a cylindrical shape having one first installation hole 30 in its bottom face is formed. With regard to the columnar flat surface 102, the height thereof is generally low; for example, it may be set to a height of 1.5 cm. With regard to the annular flat surface 101, the width value of the ring shape thereof is generally greater than the height value of the columnar flat surface 102; for example, the width of the ring shape of the annular flat surface 101 may be set to 3 cm.

Figure 3:
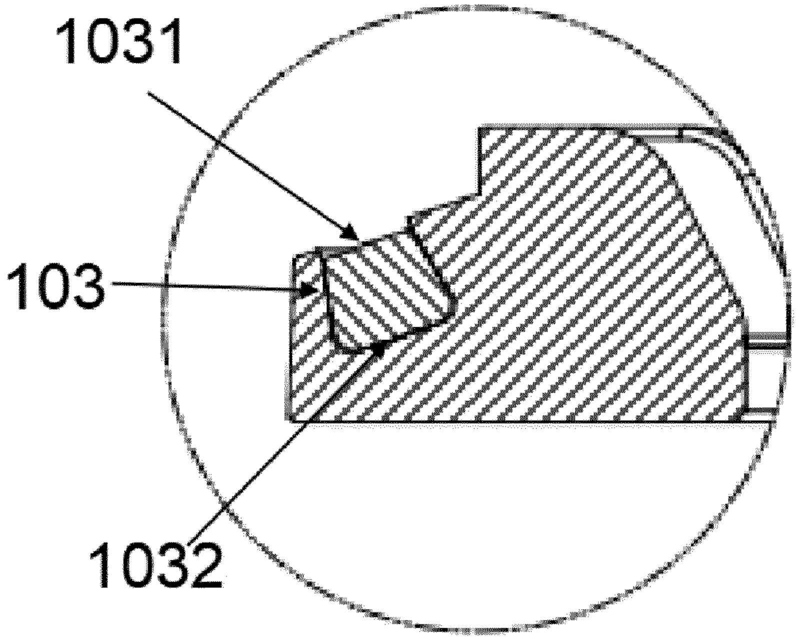
FIG. 3 is a schematic drawing of an annular groove, as provided in an embodiment of the present invention.

As shown in FIG. 3, when the annular groove 103 is provided on the annular flat surface 101 of the annular shell 10, consideration may be given to configuring the annular groove 103 as a trapezoidal groove, the width of a groove mouth 1031 in the trapezoidal groove being less than the width of a groove bottom 1032.

Account is taken of the fact that the rotation speed of the rotor will often be very high during operation of the electric machine. Although the rotor is fixed in the annular groove 103, such a high rotation speed and long-term operation of the electric machine are likely to cause the rotor to loosen or even fall off. If the rotor loosens or falls off, adjustment of the balance of the electric machine rotor will not be possible, and rotor imbalance might be increased. More seriously, if the rotor falls off, it might cause damage to the electric machine due to the impulsive force of springing out, and may even pose a safety risk to workers in the vicinity.

In view of this, in this embodiment, consideration is given to configuring the annular groove 103 as a trapezoidal groove, and making the width of the groove mouth 1031 of the trapezoidal groove less than the width of the groove bottom 1032. With such a configuration, the balancing block 20 can be firmly fixed in the annular groove 103. Even if a fixed part of the balancing block 20 loosens, the balancing block will not detach from the annular groove 103 and so will not cause damage to the electric machine or even compromise worker safety, because the groove mouth 1031 of the trapezoidal groove is very small.

Of course, in other embodiments, the annular groove 103 may also have other shapes, for example, round, in which case the size of the groove mouth 1031 is one quarter of an arc, or as another example, elliptical, in which case the groove mouth 1031 is opened in an arc that the long axis of the ellipse lies on. Specifically, the shape of the annular groove 103 may be determined according to the shape of the balancing block 20; of course, the shape of the balancing block 20 may also be determined according to the shape of the annular groove 103. For example, if the annular groove 103 in the annular shell 10 is a trapezoidal groove, then the balancing block 20 may be configured as a cuboid, a hexahedron with a trapezoidal cross section, etc., wherein the width of the balancing block 20 facing the plane in which the groove mouth 1031 of the annular groove 103 lies should be greater than the width of the groove mouth 1031; in this way, the action of fixing the balancing block 20 can be enhanced. As another example, if the balancing block 20 is round, then the annular groove 103 in the annular shell 10 may be configured as a round groove, and the width of the groove mouth 1031 of the round groove should not exceed the diameter of the round balancing block 20; this can make the balancing block 20 more secure, so that it will not fall off due to high-speed rotation of the rotor.

Figure 4:
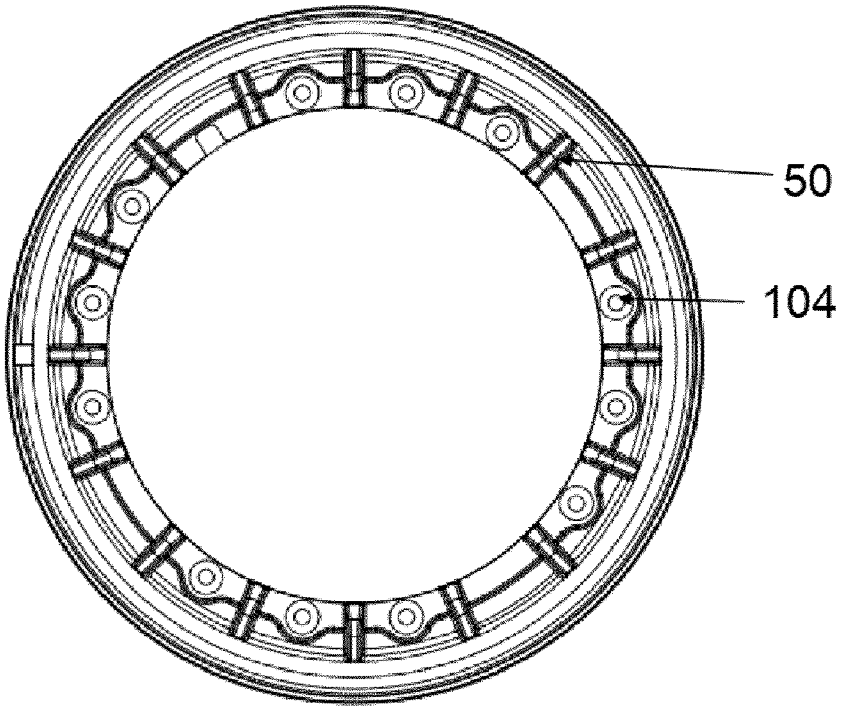
FIG. 4 is a schematic drawing of a pressure ring for an electric machine rotor, as provided in another embodiment of the present invention.

The electric machine will generate a large amount of heat during operation. For example, when the electric machine is operating, temperatures will be very high in the stator windings and other places inside the electric machine, but pressure rings for electric machine rotors that are commonly used at present do not allow circulation of air inside the electric machine, so heat cannot be dissipated from the interior of the electric machine, and long periods in a high-temperature state will inevitably cause damage to the electric machine. In view of this, as shown in FIG. 4, in this embodiment, consideration is given to providing at least one fan blade 50 inside the annular shell 10; the at least one fan blade 50 is distributed inside the annular shell 10, and the positions of the first fixing hole 104 on the annular flat surface 101 and the fan blade 50 do not coincide.

The pressure ring will be fixed to the electric machine rotor by means of the first fixing hole 104, and when the electric machine rotor rotates, the electric machine rotor drives the pressure ring to rotate. For this reason, in this embodiment, consideration is given to providing a fan blade 50 inside the annular shell 10. Thus, when the pressure ring rotates, the fan blade 50 will drive air to flow, cooling the electric machine by air circulation, i.e. can achieve the effect of enhancing heat dissipation from the electric machine by air cooling.

Of course, the number of fan blades 50 provided is also very important. For example, if the number of fan blades 50 is smaller, then the air driving effect is not good enough, and consequently the effect of enhancing heat dissipation by air cooling is limited. Moreover, if the number of fan blades 50 is smaller, the air column formed between two adjacent fan blades 50 will be longer, so the noise produced will be greater. Thus, consideration may be given to having a certain relationship satisfied between two adjacent fan blades 50; for example, an angle formed by two rays extending from the centre position of the first installation hole 30 to two adjacent fan blades 50 is not greater than 30°. That is to say, in one embodiment, at least 12 fan blades 50 should be distributed around the 360° circumference of the annular shell 10; this can achieve a very good effect in terms of heat dissipation by air cooling, and can also prevent the fan blades 50 from causing loud noise.

It is worth pointing out that the fan blades 50 distributed inside the annular shell 10 should be distributed as uniformly as possible; this can increase the stability of air circulation, which helps to both reduce noise and enhance the effect of heat dissipation by air cooling. In addition, when the fan blade 50 is configured, the position thereof should not coincide with the first fixing hole 104; in this way, it is ensured that the configuration of the fan blade 50 will not affect the fixing of the annular shell 10.

Figure 5:
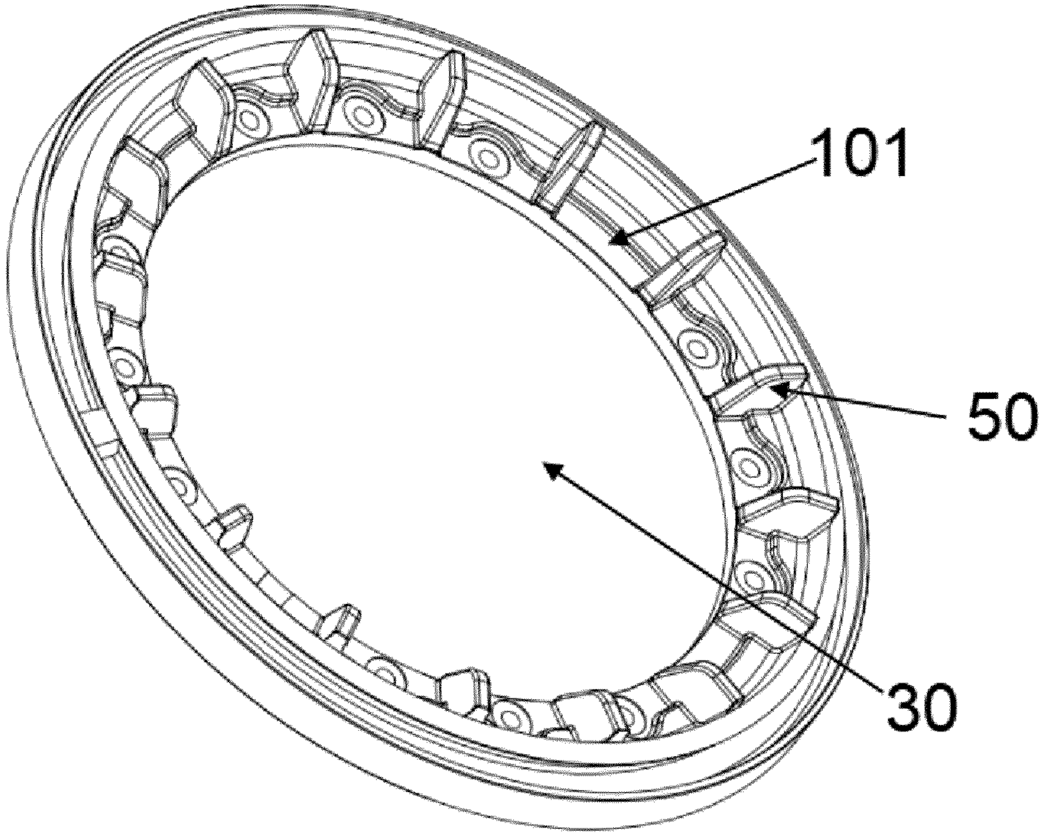
FIG. 5 is a schematic drawing of a pressure ring for an electric machine rotor, as provided in another embodiment of the present invention.
Figure 6:
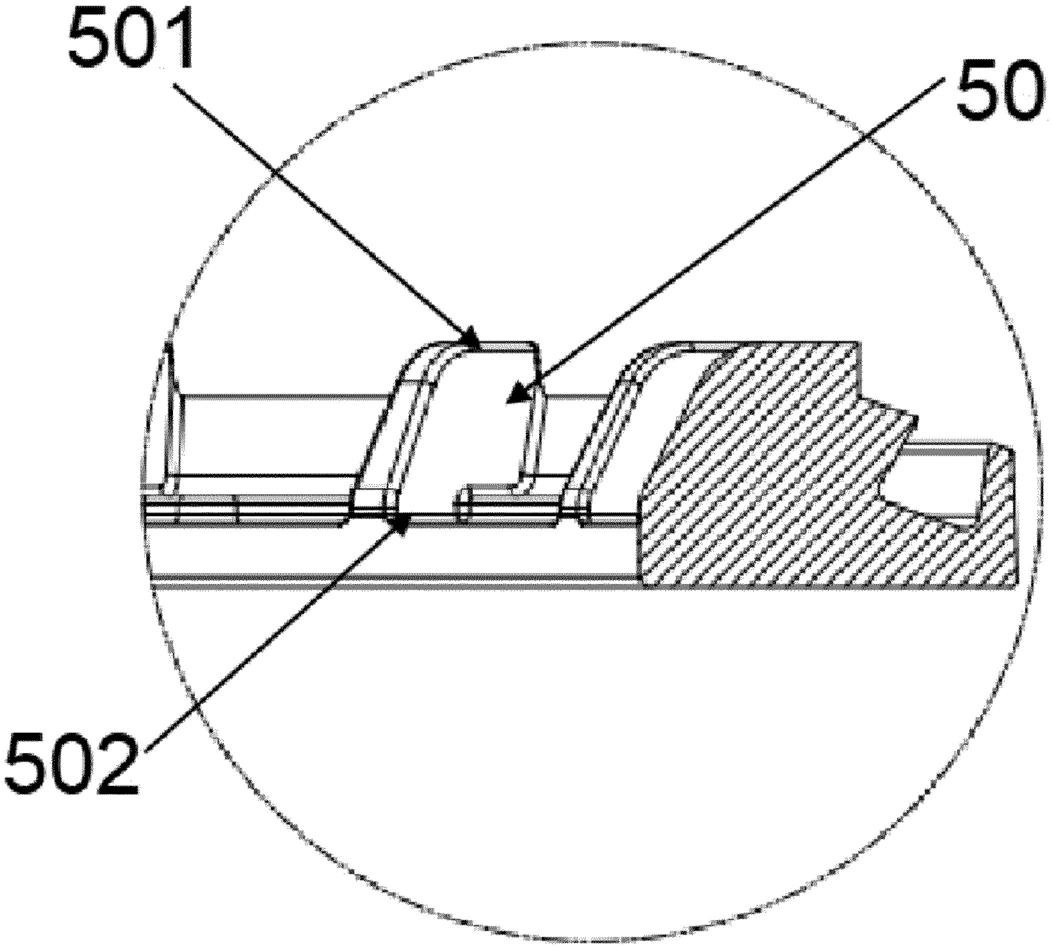
FIG. 6 is a schematic drawing of a fan blade, as provided in an embodiment of the present invention.

As shown in FIGS. 5 and 6, the fan blade 50 may be configured to be trapezoidal; moreover, a lower base 502 of the trapezoidal shape has a greater length than an upper base 501, wherein the lower base 502 is an edge in contact with the annular flat surface 101. As a result of configuring the fan blade 50 to have a trapezoidal shape in which the upper base 501 is smaller than the lower base 502, the fan blade 50 becomes narrower from bottom to top in the direction from the first installation hole 30 towards the annular shell 10, and it can thus be ensured that sufficient space is provided for installation and fixing between the annular shell 10 and the electric machine rotor, so that fixing between the annular shell 10 and the electric machine rotor will not be affected.

Furthermore, when the fan blade 50 is configured, the fan blade 50 may be configured to be perpendicular to the annular flat surface 101, with the lower base 502 of the fan blade 50 lying in a radial direction of the annular flat surface 101, and one end of the lower base 502 of the fan blade 50 aligned with an inner ring edge of the annular flat surface 101.

Firstly, with this configuration, i.e. with the fan blade 50 configured to be perpendicular to the annular flat surface 101, with the lower base 502 of the fan blade 50 lying in a radial direction of the annular flat surface 101, it can be ensured that the fan blade 50 faces directly in the direction of rotation of the annular shell 10 of the pressure ring, so the area of contact between the fan blade 50 and the flowing air is increased. Furthermore, the fan blade 50 facing directly in the direction of the annular shell 10 can drive more air to circulate during rotation, and can thereby further enhance the effect of dissipating heat from the electric machine by air cooling.

Secondly, by configuring one end of the lower base 502 of the fan blade 50 to be aligned with the inner ring edge of the annular flat surface 101, it is ensured that the fan blade 50 will not protrude towards the inside of the annular flat surface 101, and it can thus be ensured that fitting to the electric machine rotor will not be affected when the area of contact between the fan blade 50 and flowing air is largest, i.e. the fitting of the rotation shaft through the first installation hole 30 will not be affected due to the fan blade 50 protruding in the direction of an inner ring of the annular flat surface 101.

It must be pointed out that the fan blade 50 may also be a right trapezium, wherein the right-angled leg coincides with and is fixed to the columnar flat surface 102; and of the two bases, the lower base 502 that is in contact with and fixed to the annular flat surface 101 is longer than the upper base 501. Of course, in other embodiments, the fan blade 50 may also include other shapes, e.g. round, elliptical, rectangular, etc., which may be set according to the specific application scenario and requirements.

Embodiments of the present invention also provide an electric machine rotor, which may comprise a rotor body and a pressure ring as provided in any one of the embodiments above, wherein the pressure ring is fixed to the rotor body by means of at least one first fixing hole 104, and a rotation shaft on the rotor body passes through a first installation hole 30 of the pressure ring.

Embodiments of the present invention also provide an electric machine, comprising: an electric machine body, and a pressure ring as described in any embodiment in the first aspect mentioned above; the pressure ring is fixed to the rotor of the electric machine body by means of at least one first fixing hole 104.

It must be explained that not all modules in the structural drawings of apparatuses and procedures above are necessary; some steps or modules may be omitted according to actual needs. The order in which the steps are performed is not fixed, and may be adjusted as needed. The system structures described in the above embodiments may be physical structures or logic structures, i.e. some modules might be realized by the same physical entity, or some modules might be realized by multiple physical entities separately, or may be realized jointly by certain components in multiple independent devices.

In the above embodiments, hardware modules may be realized mechanically or electrically. For example, a hardware module may comprise a permanent dedicated circuit or logic (e.g. a special processor, FPGA or ASIC) to perform a corresponding operation. The hardware module may also comprise programmable logic or circuitry (e.g. a general-purpose processor or other programmable processor), and may be configured temporarily by software to perform a corresponding operation. The specific manner of implementation (mechanical implementation, or a dedicated permanent circuit, or a temporarily configured circuit) may be determined based on cost and time considerations.

The present invention has been disclosed and described in detail above by means of the drawings and preferred embodiments, but is not limited to these disclosed embodiments. Based on the embodiments above, those skilled in the art will know that code review methods in different embodiments above may be combined to obtain more embodiments of the present invention, and these embodiments are also within the scope of protection of the present invention.

What is claimed is:

1. A pressure ring for an electric machine rotor, the pressure ring comprising:
an annular shell; and
a balancing block;
wherein the annular shell comprises an annular flat surface and a columnar flat surface;
wherein a first installation hole is formed in the annular flat surface, and a bottom edge of the columnar flat surface coincides with an outer ring edge of the annular flat surface;
wherein an annular groove and a first fixing hole are provided on the annular flat surface of the annular shell, wherein the annular groove is configured as a trapezoidal groove, and a width of a groove mouth in the trapezoidal groove is less than a width of a groove bottom of the trapezoidal groove; and
wherein the balancing block is disposed in the annular groove and is adapted to adjust balance of the electric machine rotor, the first installation hole is adapted to receive a rotation shaft of the electric machine rotor, and the first fixing hole is adapted to facilitate mounting of the electric machine rotor to the annular shell.

2. The pressure ring of claim 1, further comprising a fan blade, wherein the fan blade is distributed inside the annular shell and positions of the first fixing hole and the fan blade do not coincide.

3. The pressure ring of claim 2, wherein an angle formed by two rays extending from a center position of the first installation hole to two adjacent fan blades is not greater than 30°.

4. The pressure ring of claim 2, wherein the fan blade comprises a trapezoidal shape, and a length of a lower base of the trapezoidal shape is greater than a length of an upper base, wherein the lower base is an edge in contact with the annular flat surface.

5. The pressure ring of claim 4, wherein the fan blade is perpendicular to the annular flat surface, the lower base of the fan blade lies in a radial direction of the annular flat surface, and one end of the lower base of the fan blade is aligned with an inner ring edge of the annular flat surface.

6. An electric machine comprising:
a rotor;
an electric machine body; and
a pressure ring that comprises:
an annular shell, the annular shell comprising an annular flat surface and a columnar flat surface, wherein a first installation hole is formed in the annular flat surface, a bottom edge of the columnar flat surface coincides with an outer ring edge of the annular flat surface, and an annular groove and a first fixing hole are provided on the annular flat surface; and
a balancing block;
wherein a rotation shaft of the electric machine passes through the first installation hole, and the rotor is fixed to the annular shell via the first fixing hole so that the rotor drives the annular shell to rotate;
wherein the balancing block is distributed in the annular groove of the annular flat surface and adjusts rotor balance when the rotor rotates, wherein the annular groove is configured as a trapezoidal groove, and a width of a groove mouth in the trapezoidal groove is less than a width of a groove bottom of the trapezoidal groove; and
wherein the pressure ring is fixed to the rotor via the first fixing hole.

7. The electric machine of claim 6, wherein the pressure ring further comprises a fan blade, wherein the fan blade is distributed inside the annular shell and positions of the first fixing hole and the fan blade do not coincide.

8. The electric machine of claim 6, wherein the pressure ring further comprises fan blades, wherein an angle formed by two rays extending from a center position of the first installation hole to two adjacent fan blades is not greater than 30°.

9. The electric machine of claim 6 wherein the pressure ring further comprises a fan blade, wherein the fan blade comprises a trapezoidal shape, and a length of a lower base of the trapezoidal shape is greater than a length of an upper base, wherein the lower base is an edge in contact with the annular flat surface.

10. The electric machine of claim 9, wherein the fan blade is perpendicular to the annular flat surface, the lower base of the fan blade lies in a radial direction of the annular flat surface, and one end of the lower base of the fan blade is aligned with an inner ring edge of the annular flat surface.

11. An electric machine comprising:
a rotor;
an electric machine body; and
a pressure ring that comprises:
an annular shell, the annular shell comprising an annular flat surface and a columnar flat surface, wherein a first installation hole is formed in the annular flat surface, a bottom edge of the columnar flat surface coincides with an outer ring edge of the annular flat surface, and an annular groove and a first fixing hole are provided on the annular flat surface; and
a balancing block;
wherein a rotation shaft of the electric machine passes through the first installation hole, and the rotor is fixed to the annular shell via the first fixing hole so that the rotor drives the annular shell to rotate;
wherein the balancing block is distributed in the annular groove of the annular flat surface and adjusts rotor balance when the rotor rotates;
wherein the pressure ring is fixed to the rotor via the first fixing hole; and
wherein the pressure ring further comprises fan blades, wherein the fan blades are distributed inside the annular shell and positions of the first fixing hole and the fan blade do not coincide, wherein an angle formed by two rays extending from a center position of the first installation hole to two adjacent fan blades is not greater than 30°.

12. An electric machine comprising:
a rotor;
an electric machine body; and a pressure ring that comprises:

an annular shell, the annular shell comprising an annular flat surface and a columnar flat surface, wherein a first installation hole is formed in the annular flat surface, a bottom edge of the columnar flat surface coincides with an outer ring edge of the annular flat surface, and an annular groove and a first fixing hole are provided on the annular flat surface; and a balancing block;

wherein a rotation shaft of the electric machine passes through the first installation hole, and the rotor is fixed to the annular shell via the first fixing hole so that the rotor drives the annular shell to rotate;

wherein the balancing block is distributed in the annular groove of the annular flat surface and adjusts rotor balance when the rotor rotates;

wherein the pressure ring is fixed to the rotor via the first fixing hole; and wherein the pressure ring further comprises fan blades comprising a trapezoidal shape in which a length of a lower base of the trapezoidal shape is greater than a length of an upper base of the trapezoidal shape, wherein the lower base is an edge in contact with the annular flat surface, and wherein the fan blades are distributed inside the annular shell and positions of the first fixing hole and the fan blade do not coincide.

* * * * *